United States Patent
Casares et al.

(10) Patent No.: US 9,342,823 B2
(45) Date of Patent: May 17, 2016

(54) PAYMENT CLEARING NETWORK FOR ELECTRONIC FINANCIAL TRANSACTIONS AND RELATED PERSONAL FINANCIAL TRANSACTION DEVICE

(75) Inventors: Wenceslao Casares, Woodside, CA (US); Federico H. Murrone, Buenos Aires (AR)

(73) Assignee: Lemon, Inc., Tempe, AZ (US)

( * ) Notice: Subject to any disclaimer, the term of this patent is extended or adjusted under 35 U.S.C. 154(b) by 1160 days.

(21) Appl. No.: 11/969,711

(22) Filed: Jan. 4, 2008

(65) Prior Publication Data
US 2008/0313047 A1 Dec. 18, 2008

Related U.S. Application Data

(60) Provisional application No. 60/944,774, filed on Jun. 18, 2007.

(51) Int. Cl.
*G06Q 20/00* (2012.01)
*G06Q 40/00* (2012.01)
*G06Q 20/10* (2012.01)
*G06Q 20/20* (2012.01)
*G06Q 20/40* (2012.01)
*G06Q 40/02* (2012.01)

(52) U.S. Cl.
CPC ........... *G06Q 20/10* (2013.01); *G06Q 20/20* (2013.01); *G06Q 20/204* (2013.01); *G06Q 20/40* (2013.01); *G06Q 40/02* (2013.01)

(58) Field of Classification Search
USPC .................................... 705/17, 42, 39, 64, 76
See application file for complete search history.

(56) References Cited

U.S. PATENT DOCUMENTS

| | | | | |
|---|---|---|---|---|
| 4,454,414 A | * | 6/1984 | Benton | G07F 7/0866 235/379 |
| 5,204,512 A | * | 4/1993 | Ieki | G06K 7/0008 235/375 |
| 5,221,838 A | * | 6/1993 | Gutman | G06Q 20/32 235/379 |
| 5,267,314 A | | 11/1993 | Stambler | |

(Continued)

OTHER PUBLICATIONS

PCT/US08/058515, Search Report and Written Opinion of International Searching Authority mailed Jun. 30, 2008.

(Continued)

*Primary Examiner* — Ashford S Hayles
(74) *Attorney, Agent, or Firm* — Baker & McKenzie LLP (57) ABSTRACT

Described herein are networks and related devices and methods for facilitating the electronic transfer of funds and electronic purchases between consumers, merchants, and other parties. Also facilitated by the principles described herein is the electronic transfer of funds or payments between individuals. The disclosed principles provide for the funds of a user's account to never leave his original financial account until the financial transaction takes place. Thus, no special accounts within the payment system are required to be opened, maintained, or funded by a user. Instead, funds are simply transferred to or from a user's associated financial account by the financial institution maintaining that account and in accordance with instructions from the network. Thus, the present disclosure provides for fund transfers and purchases between parties in a secure, efficient, and the user-friendly manner. The disclosed principles provide for such transactions using, in some embodiments, portable devices, which may be dedicated devices associated with the disclosed network, or available consumer devices configured to operate with the network.

14 Claims, 6 Drawing Sheets

(56) References Cited

U.S. PATENT DOCUMENTS

| | | | | |
|---|---|---|---|---|
| 5,434,395 A * | 7/1995 | Storck | G06K 7/0021 | 235/375 |
| 5,524,073 A | 6/1996 | Stambler | | |
| 5,555,303 A | 9/1996 | Stambler | | |
| 5,586,312 A * | 12/1996 | Johnson | G06F 9/466 | |
| 5,646,998 A | 7/1997 | Stambler | | |
| 5,793,302 A | 8/1998 | Stambler | | |
| 5,936,541 A | 8/1999 | Stambler | | |
| 5,974,148 A | 10/1999 | Stambler | | |
| 6,010,067 A * | 1/2000 | Elbaum | G06Q 20/04 | 235/375 |
| 6,112,984 A * | 9/2000 | Snavely | G07G 1/14 | 235/379 |
| 6,131,811 A * | 10/2000 | Gangi | G06K 7/0004 | 235/380 |
| 6,149,055 A * | 11/2000 | Gatto | G06Q 20/10 | 235/379 |
| 6,234,389 B1 * | 5/2001 | Valliani | G06Q 20/20 | 235/379 |
| 6,366,893 B2 * | 4/2002 | Hannula | G06Q 20/027 | 379/93.12 |
| 6,393,411 B1 * | 5/2002 | Bishop | G06Q 20/06 | 70/39 |
| 6,424,845 B1 * | 7/2002 | Emmoft | G06Q 20/04 | 455/558 |
| 6,454,164 B1 * | 9/2002 | Wakabayashi | G06K 7/0021 | 235/379 |
| 6,502,748 B2 * | 1/2003 | Berg | G06K 7/0008 | 235/379 |
| 6,614,768 B1 * | 9/2003 | Mahany | G06F 1/1626 | 370/328 |
| 6,676,017 B1 * | 1/2004 | Smith, III | G06Q 20/20 | 235/380 |
| 6,881,097 B2 * | 4/2005 | Matsunaga | G06K 7/0021 | 439/630 |
| 6,934,689 B1 * | 8/2005 | Ritter | G06Q 20/04 | 705/16 |
| 6,988,657 B1 * | 1/2006 | Singer | G06Q 20/0855 | 235/380 |
| 6,997,381 B2 * | 2/2006 | Arnouse | G06K 7/00 | 235/379 |
| 7,096,494 B1 * | 8/2006 | Chen | G06Q 20/04 | 380/259 |
| 7,376,583 B1 * | 5/2008 | Rolf | G06Q 20/20 | 705/17 |
| RE40,444 E * | 7/2008 | Linehan | G06Q 20/02 | 705/65 |
| 7,481,363 B2 * | 1/2009 | Zuili | G06Q 20/341 | 235/380 |
| 7,536,336 B1 * | 5/2009 | Guinan | G06Q 30/06 | 705/37 |
| 7,540,408 B2 * | 6/2009 | Levine | G06Q 20/04 | 235/379 |
| 7,630,939 B1 * | 12/2009 | Kolls | G06Q 20/042 | 705/43 |
| 7,677,459 B2 * | 3/2010 | Arnouse | G06K 7/00 | 235/486 |
| 7,720,756 B2 * | 5/2010 | Kavounas | G06Q 20/04 | 705/37 |
| 7,798,394 B2 * | 9/2010 | Hill | G06K 7/0008 | 235/375 |
| 7,840,494 B2 * | 11/2010 | Wiederin | G06Q 20/00 | 705/64 |
| 7,853,525 B2 * | 12/2010 | Yeates | G06Q 20/02 | 705/35 |
| 7,895,122 B2 * | 2/2011 | Flitcroft | G06Q 20/04 | 705/30 |
| 8,032,460 B2 * | 10/2011 | Takatori | G06Q 20/04 | 705/35 |
| 8,074,872 B2 * | 12/2011 | Naccache et al. | | 235/379 |
| 8,380,636 B2 * | 2/2013 | Smith, III | G06Q 20/20 | 705/64 |
| 8,494,910 B2 * | 7/2013 | Short | G06Q 30/0613 | 705/26.25 |
| 8,762,263 B2 * | 6/2014 | Gauthier | G06Q 20/24 | 705/39 |
| 2001/0037249 A1 * | 11/2001 | Fitzgerald | G06Q 20/20 | 705/23 |
| 2003/0144909 A1 * | 7/2003 | Flaherty | G06Q 20/18 | 705/17 |
| 2003/0162565 A1 * | 8/2003 | Al-Khaja | G06Q 20/04 | 455/558 |
| 2003/0216996 A1 * | 11/2003 | Cummings | G06Q 20/02 | 705/39 |
| 2005/0015332 A1 * | 1/2005 | Chen | G06Q 20/04 | 705/39 |
| 2005/0080748 A1 * | 4/2005 | Belobaba | G06Q 40/02 | 705/65 |
| 2005/0222925 A1 * | 10/2005 | Jamieson | G06Q 20/10 | 705/35 |
| 2005/0256802 A1 | 11/2005 | Ammermann et al. | | |
| 2006/0000900 A1 * | 1/2006 | Fernandes | G06Q 20/04 | 235/380 |
| 2006/0100966 A1 * | 5/2006 | Park | G06Q 20/12 | 705/67 |
| 2006/0178918 A1 | 8/2006 | Mikurak | | |
| 2006/0248016 A1 | 11/2006 | Ginter et al. | | |
| 2006/0277136 A1 | 12/2006 | O'connor et al. | | |
| 2007/0022058 A1 * | 1/2007 | Labrou | G06Q 20/32 | 705/67 |
| 2007/0288392 A1 * | 12/2007 | Peng | G06Q 20/04 | 705/72 |
| 2007/0295803 A1 * | 12/2007 | Levine | G06Q 20/04 | 235/379 |
| 2008/0004894 A1 * | 1/2008 | Son | G06Q 20/32 | 455/557 |
| 2008/0015985 A1 * | 1/2008 | Abhari | G06Q 20/10 | 705/42 |
| 2008/0027815 A1 * | 1/2008 | Johnson | G06Q 20/204 | 705/17 |
| 2008/0041936 A1 * | 2/2008 | Vawter | G06Q 20/00 | 235/380 |
| 2008/0052091 A1 * | 2/2008 | Vawter | G06Q 20/10 | 705/39 |
| 2008/0103923 A1 * | 5/2008 | Rieck | G06Q 20/12 | 705/26.41 |
| 2008/0177668 A1 * | 7/2008 | Delean | G06Q 20/10 | 705/76 |
| 2008/0227391 A1 * | 9/2008 | Rosenberg | G06Q 20/3226 | 455/41.1 |
| 2008/0257952 A1 * | 10/2008 | Zandonadi | G06Q 20/02 | 235/379 |
| 2008/0270246 A1 * | 10/2008 | Chen | G06Q 20/105 | 705/17 |
| 2009/0248579 A1 * | 10/2009 | Kaminski | G06Q 20/0855 | 705/67 |
| 2010/0042538 A1 * | 2/2010 | Dheer et al. | | 705/40 |
| 2010/0094756 A1 * | 4/2010 | Humphrey et al. | | 705/44 |
| 2010/0100461 A1 * | 4/2010 | Laing et al. | | 705/30 |
| 2010/0332386 A1 * | 12/2010 | Vancini | G06Q 20/10 | 705/40 |
| 2011/0258120 A1 * | 10/2011 | Weiss | G06F 21/32 | 705/44 |
| 2012/0239575 A1 * | 9/2012 | Myers | G06Q 20/027 | 705/44 |
| 2013/0024378 A1 * | 1/2013 | Huang | G06Q 20/045 | 705/44 |
| 2014/0358763 A1 * | 12/2014 | Grovit | G06Q 20/00 | 705/37 |
| 2015/0100499 A1 * | 4/2015 | Dua | G06Q 20/20 | 705/76 |

OTHER PUBLICATIONS

Peha et al. 'PayCash: a secure efficient Internet payment system' [online]. In: Proceedings of the 5th international conference on Electronic commerce, ACM International Conference Proceedings Series, vol. 50, p. 125-130. Published Oct. 2003. http://paycashwallet.com/merchant/AboutPayCash/paycash_whitepaper.pdf.

* cited by examiner

PAYMENT CLEARING NETWORK FOR ELECTRONIC FINANCIAL TRANSACTIONS AND RELATED PERSONAL FINANCIAL TRANSACTION DEVICE

CROSS-REFERENCE TO RELATED APPLICATION

This application claims the benefit of U.S. Provisional Application Ser. No. 60/944,774, filed on Jun. 18, 2007, and entitled "Personal Transaction Device for Electronic Management of Account Funds," commonly assigned with the present application and incorporated herein by reference in its entirety for all purposes.

TECHNICAL FIELD

The disclosed systems and methods are generally related to electronic financial transactions, and more particularly to a financial or payment clearing network for the electronic management of user financial accounts and for engaging in electronic financial transactions, the electronic transfer of funds, and electronic purchases between consumers and merchants.

BACKGROUND

The increasing use of credit cards provides ample evidence that consumers prefer to use electronic payment systems rather than carry large amounts of cash or suffer the hassle of writing multiple checks for small purchases. Despite the rising use of ATM networks and online banking and other means of electronic financial transactions, as well as individual financial tools like debit cards, credit cards, checks, and other personal payment means, there is still a huge global population of people who rely primarily on cash transactions and who still need a convenient and cost effective electronic payment system to send and receive money. Even with the widespread adoption of electronic payment systems, there is an increasing need for faster, cheaper and more convenient electronic payment systems for completing financial transactions. Further, there is a need for an electronic payment system that is more individualized such that financial transactions are easily concluded in a manner similar to cash transactions.

This need has led to the growing use of prepaid debit cards. Unfortunately, debit cards are primarily designed so that a consumer can cash-in the debit card at a merchant who has invested in a point-of-sale (POS) transaction terminal. Thus, as with credit cards, it is difficult for an individual to transfer a portion of the amount stored on a prepaid debit card to another individual without involving an inconvenient trip to a bank or a merchant with a POS terminal. There is a need for an electronic payment system that enables financial transactions to be concluded between individuals and without the need to directly involve a third party financial institution or an outside financial institution. Although many people do not have access to POS terminals, most have access to a portable wireless communications device, such as a cellular or mobile phone, BlackBerry®, personal data assistant (PDA), etc. Indeed, people now routinely take advantage of additional features provided by a typical mobile phone, such as text messaging, photography, and listening to music, as mobile devices have evolved to include an integrated PDA, MP3, paging, and e-mail capabilities, all in a single device.

There has been explosive growth in mobile telephony devices and other portable devices that handle communications either through voice, e-mail, SMS messaging, instant messaging, and the Internet. People will often remember to carry their mobile device or cellular phone with them, even if they forget to carry their wallet or car keys. Additionally, such mobile devices are ubiquitous in the U.S. and in many countries around the world. It is currently estimated that about 80 percent of the world's population has mobile phone coverage. Therefore, systems that permit such mobile devices to send and receive payments, just like cash, and provide other financial and mobile banking transactions, are very advantageous.

In addition to individual or one-on-one transactions, existing electronic transaction networks have also gained popularity recently. Known banking systems include credit card networks, ATM networks, Automated Clearing House (ACH) networks, debit card networks, and other similar networks. In addition, typical means for authenticating users and transactions in such networks include magnetic strips on cards and, recently, near-field radio frequency (RF) communications devices that allow for purchases using smart cards, tags, or other such components having RF-based communications components contained therein. While the near-field communications-based devices provide for a convenience of contactless payment, which was not previously known particularly with respect to ATM-based, debit-card-based, and credit-card-based commerce systems, currently implemented near-field RF-based devices have not provided the convenience, simplicity, and security that would be necessary for a consumer to feel secure in their electronic purchases.

However, even modern electronic financial networks have their limitations or inconveniences when attempting to engage in financial transactions. With respect to various conventional electronic payment systems done through on-line banking or other commerce systems, there has not previously been an ability to easily administer payments to or from an account holder's personal account. For example, recently popular systems, such as PayPal® from eBay® and Text-PayMe® from Amazon.com®, have their advantages for conducting personal one-on-one financial transactions between two individuals using mobile devices. However, a key drawback to these systems is the need to open and maintain monetary funds in a specific account maintained by the system. However, funds availability in such systems could be a problem if a buyer wishes to engage in a financial transaction immediately, but does not have enough funds in his specific account. While transferring funds into that account may be possible, the inconvenience of having to do so, along with the risk that the purchase opportunity may be lost if the buyer cannot move fast enough (e.g., an auction, a garage sale, etc.).

SUMMARY

There is a need for a network and associated methods and devices for conducting financial transactions with minimal risk and ease, and that do not suffer from the deficiencies found in conventional approaches. To address problems found in conventional networks and approaches, described herein are devices, methods, and systems for facilitating the electronic transfer of funds and electronic purchases between consumers and merchants. Also facilitated by the devices, systems, and methods described herein are the electronic transfer of funds or payments between individuals. The disclosed principles provide for such transactions by accessing the disclosed financial clearing network through an access gateway, which may be remote from the network such as through a web browser, or even by using portable devices. The disclosed network allows for today's electronic financial transactions without the need to fund and maintain a specific account. Additionally, the disclosed network and related methods allow a user to have efficient commercial transactions with other consumers and with merchants, and which also allow consumers to conveniently and securely access their credit- or debit-based personal accounts. Thus, the present disclosure provides for fund transfers and purchases between parties in a secure, efficient, and the user-friendly manner, as well as electronic access and management of financial accounts.

In one embodiment, a payment network for performing financial transactions is disclosed. In such an embodiment, the network may comprise a payment system in communication with first and second financial devices associated with corresponding first and second users, and with one or more financial institutions facilitating corresponding first and second user financial accounts, wherein the first and second user financial accounts are associated with the payment system. In addition, such a network may comprise an interface connected to the payment system and configured to receive information about the desired financial transaction from one or both of the first and second financial devices, and to receive authorization to participate in the desired financial transaction from both financial devices. Upon receiving the authorizations, the payment system is configured to cause the transfer of funds by the one or more financial institutions from one of the first or second financial accounts to the other of the financial accounts in accordance with the received information about the desired financial transaction.

Also disclosed are methods of performing financial transactions, where such methods comprise permitting access to the network by one or both of first and second users via an access gateway, and providing a payment system in communication with the access gateway, and with one or more financial institutions facilitating corresponding first and second user financial accounts. Such methods also include associating the first and second user financial accounts with the payment system, receiving in the payment system information about the desired financial transaction from one or both of the users via the access gateway, and receiving in the payment system authorization to participate in the desired financial transaction from both users via the access gateway. Upon receiving the authorizations, such a method further includes the payment system causing the transfer of funds by the one or more financial institutions from one of the first or second financial accounts to the other of the financial accounts in accordance with the received information about the desired financial transaction.

In a related aspect, a network for performing financial transactions is disclosed, which includes an access gateway configured to permit access to the network by one or both of first and second users. Such a network also includes a payment system in communication with the access gateway, and with one or more financial institutions facilitating corresponding first and second user financial accounts, wherein the first and second user financial accounts are associated with the payment system. Also includes is an interface connected to the payment system and to the access gateway, and configured to receive information about the desired financial transaction from one or both of the users, and to receive authorization to participate in the desired financial transaction from both users, via the access gateway. Upon receiving the authorizations, the payment system is configured to cause the transfer of funds by the one or more financial institutions from one of the first or second financial accounts to the other of the financial accounts in accordance with the received information about the desired financial transaction.

In another embodiment, a proprietary financial device for conducting a financial transaction is disclosed. In such an embodiment, the device may comprise a reading module for inputting information into the financial device about a user financial account previously associated with a payment system, and user controls for manually inputting information by a user about a desired financial transaction, as well as information for authorizing the financial transaction. In addition, such financial devices may include a display screen for displaying information about the desired financial transaction or user financial account. In such embodiments, the financial device also includes an identification module for identifying a second financial device involved in the desired financial transaction to the first financial device, and for identifying the first financial device to the second financial device. Such financial devices may also comprise a transceiver for wirelessly transmitting and receiving information to and from the payment system for causing the transfer of monetary funds to or from the associated user financial account once the identifications and authorization are made.

In yet another embodiment, a method of conducting a financial transaction with such financial devices is disclosed. In such an embodiment, the method may comprise providing a payment system in communication with first and second financial devices associated with corresponding first and second users, and with one or more financial institutions facilitating corresponding first and second user financial accounts. Such a method also includes associating the first and second user financial accounts with the payment system. Additionally, in such embodiments, the method further includes receiving in the payment system information about the desired financial transaction from one or both of the first and second financial devices, and receiving in the payment system authorization to participate in the desired financial transaction from both financial devices. Upon receiving the authorizations, the payment system causes the transfer of funds by the one or more financial institutions from one of the first or second financial accounts to the other of the financial accounts in accordance with the received information about the desired financial transaction.

In still another embodiment, a method of performing financial transactions using a personal wireless device may comprise providing a payment system configured to wirelessly communicate with a personal wireless device for performing a desired financial transaction, and with a financial institution facilitating a user financial account. Such a method may also include associating the user financial account with the payment system, inputting information about the desired financial transaction, and identifying a second device involved in the desired financial transaction to the device, as well as identifying the device to the second device. Such methods still further include authorizing the desired financial transaction, and transmitting and receiving information to and from the payment system to complete the desired financial transaction by causing money to transfer to or from the associated user financial account once the identifications and authorization are made.

BRIEF DESCRIPTION OF THE DRAWINGS

Embodiments are illustrated herein by way of example in the accompanying figures, in which like reference numbers indicate similar parts, and in which:

FIG. 3A illustrates an exemplary variety of sources and destinations the device of FIG. 3 can be used to send fund to or receive funds from;

DETAILED DESCRIPTION

Figure 1:
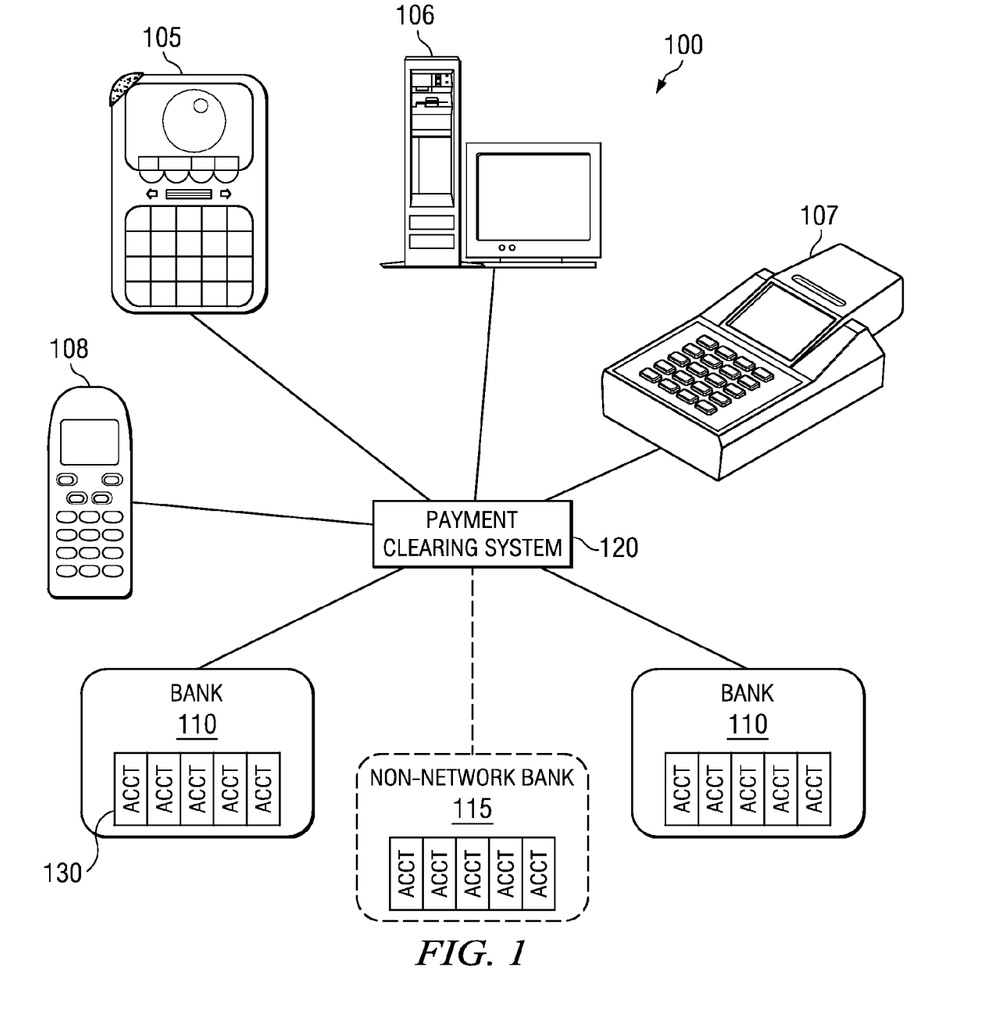
FIG. 1 illustrates a high-level block diagram of one embodiment of a payment clearing network constructed in accordance with the disclosed principles.

FIG. 1 illustrates a high-level block diagram of one embodiment of a payment clearing network 100 constructed in accordance with the disclosed principles. Included in the network 100 are a plurality of various financial institutions 110 interconnected to a plurality of means by which a user can access the network 100. For example, as illustrated, a user may be connected to the network 100 via a personal electronic financial mobile device 105, which is discussed in detail below, a mobile telephone 108, a point-of-sale (POS) terminal 107, such as at a merchant's location, and a typical personal computer 106, through which access to the network may be obtained through the Internet as discussed in detail below. Stated another way, a clearing network according to the disclosed principles is completely frontend agnostic.

Also included in the network 100 is a payment clearing system 120. The payment system 120 is in communication with the mobile financial device 105 and other access means employed by consumers or other types of users to access the network 100. In addition, the payment system 120 is also in communication with the plurality of financial institutions 110. The financial institutions 110 may comprise banks, automated clearing houses, automated teller machines, and other types of financial institutions capable of being interconnected within a network for performing financial transactions. In addition, a financial institution need not be a member of the network 100, as shown by bank 115. Such an embodiment is also discussed in detail below.

In accordance with the disclosed principles, the financial institutions 110 are responsible for facilitating financial accounts (one of which is labeled 130) of users of the network 100. For example, if the financial institution 110 is a bank, a user may maintain a checking, savings, or credit account 130 with that bank 110, and the bank 110 is responsible for facilitating that financial account 130 so that the user can conduct financial transactions with that account 130. In addition, such user financial accounts 130, no matter the type, are associated with the payment system 120 so that the account 130 may be employed in a financial transaction in accordance with the disclosed principles. Moreover, some type of consumer or security card, such as the cards 310 discussed below with reference to FIG. 3, may be issued to registered users of the network 100. For example, a typical debit or credit card from an issuing bank 110 may be employed as the card 310 since it already includes account information on its magnetic strip, or a specially issued card 310 may be created.

Figure 2:
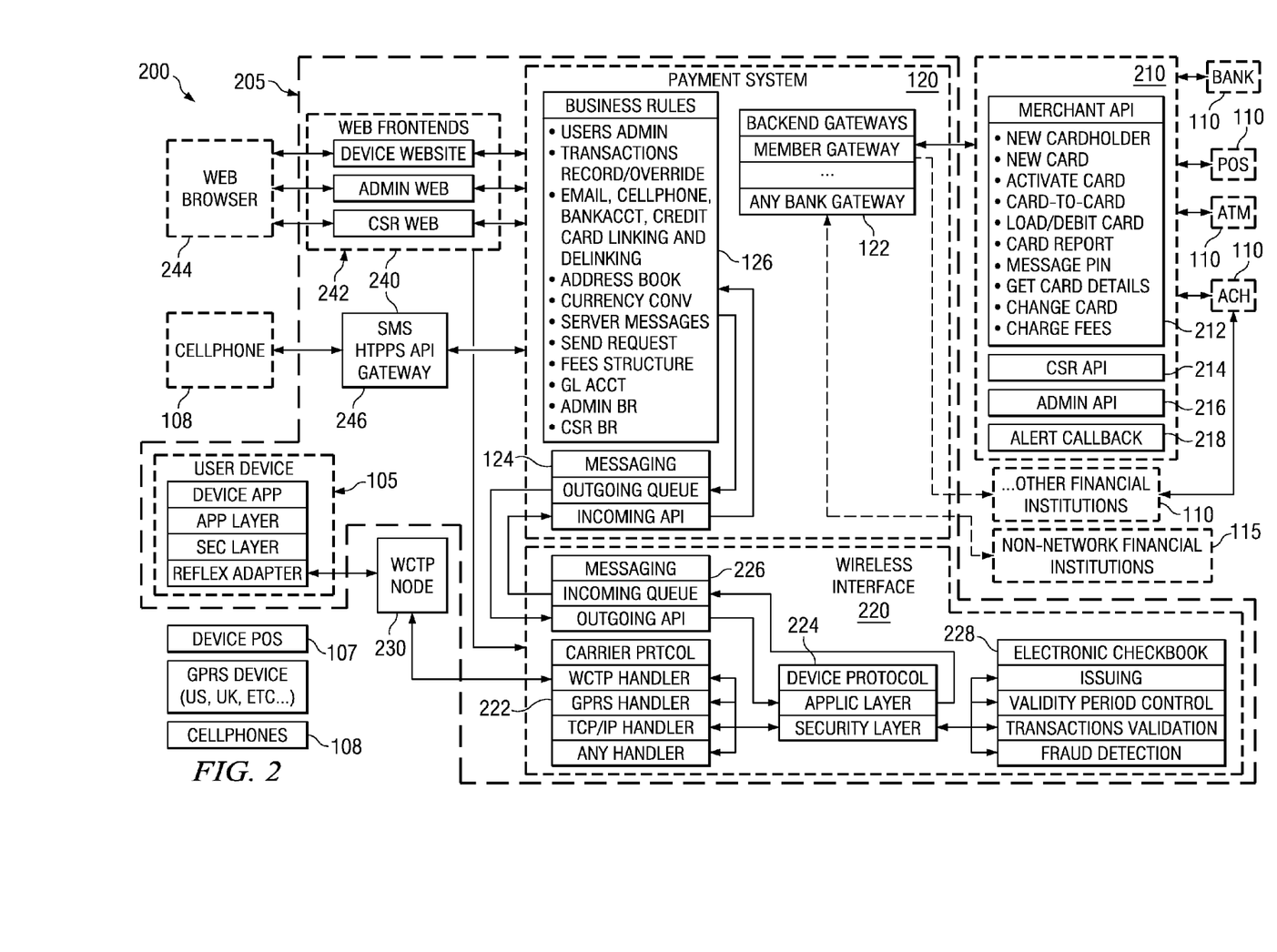
FIG. 2 illustrates a more detailed view of another embodiment of a payment clearing network incorporated into a financial network and constructed in accordance with the disclosed principles.

FIG. 2 illustrates a more detailed view of a financial network 200 that includes another embodiment of a payment clearing network 205 constructed in accordance with the disclosed principles. A payment clearing network 205 implemented as disclosed herein provides an alternative means of payment that allows its users to access their financial account information and perform electronic financial transactions anytime, anywhere and instantly. It removes the conventional bank information intermediaries employed in conventional networks, and allows its individual users to "wear" their financial accounts through any of a number of remote means, as described below. In addition, the term "payment" or "payment clearing" network should not be interpreted to limit the type or uses of a network 205 implemented as disclosed herein. Specifically, such a network 205 may be used for more than simply sending or receiving payments. For example, information and account management may also be provided through the network 205, as well as providing a means for any type of financial transaction, whether individual or conducted between two or more parties or entities.

As discussed with reference to FIG. 1, the disclosed payment network 205 in FIG. 2 may include a plurality of various member financial institutions 110 interconnected with a payment system 120, as well as other components of the payment network 205. Non-member financial institutions 115 in the financial network 200 may also be connected indirectly to the payment network 205. The financial institutions 110, 115 may comprise banks, automated clearing houses (ACH), point-of-sale (POS) terminals, automated teller machines (ATM), and other types of financial institutions capable of being interconnected within a network for performing financial transactions or providing financial information and account management. The member financial institutions 110 are responsible for facilitating and managing financial accounts of users of the network 205. For example, if the financial institution 110 is a bank, a user may maintain a checking, savings, or credit account with that bank 110, and the bank 110 is responsible for facilitating that financial account so that the user can conduct financial transactions with that account. Similar facilitation of financial accounts is provided by the other types of financial institutions 110 in the network 205.

It must be noted, however, that the financial institutions need not agree to participate in the network 205 (i.e., non-member institutions 115), and in fact in some embodiments do not know the network 205 exists or that their users (i.e., account holders) are conducting transactions within the network 205. In such embodiments, for example, a non-network bank 115 could receive funds from a member bank 110, at the direction of the clearing network 205, using an ACH or other similar means. For member institutions 110, a financial services network 210 could facilitate the interconnections of many different types of financial institutions 110 by having financial institutions 110 join as members of the financial services network 210, and then providing a uniform interface between the financial institutions 110 and the network 205. In such embodiments, the payment network 205 disclosed herein could interface with such a financial services network 210, via a backend gateway 222, which in turn allows it to conduct financial transactions with the financial institutions 110. Moreover, the financial services network 210 may be a part of the payment network 205, rather than a third-party services network 210.

As also illustrated in FIG. 2, for those other financial institutions 110 that do not interface with a financial services network 210, these institutions 110 may connect or interface directly with the payment system 120, through another backend gateway 222. In such an embodiment, the network 205 does not need to interface and cooperate with a financial services network 210 interfacing the financial institutions 110. Instead, the payment system 120 would interface directly with member institutions 110 in order to conduct the desired financial transactions. Such embodiments are advantageous for not only eliminating the use of a financial services network 210, but also by eliminating any fees associated with such networks 210, as well as any potential delays caused by routing transactions through such networks 210.

As shown in FIG. 2, the financial services network 210 typically has a number of different features, and those features may be accessed remotely by member financial institutions. For example, merchants may access the financial services network 210 via a merchant application program interface (API) 212, such as through the Internet, to activate or otherwise manage card/account holders. Similarly, a customer service representative (CSR) API 214 is available for access by customer service representatives associated, for example, with the institutions 110 or the services network 210, as are administrative APIs 216 for administrative personnel of the financial services network 210 or institutions 110 to have access for maintenance or the like. Also, an Alert Callback 218 may be provided in associated with the financial services network 210. Alert callbacks 218 can be used by the network 205 to receive updated account information for any of the accounts facilitated by the institutions 110 or other entity joined in the network 205. As discussed further below, the network 205 may employ "push" technology for "pushing" updated account information to each user so that they have real-time updates on each of their accounts. Additionally, in embodiments where no financial services network 210 is needed or employed, the payment system 120 may include some or all of these features, and other not discussed here, for use with its member institutions 110. Stated another way, all of the features and services associated with a financial services network 210 may alternatively be associated with the payment system 120 in order to further streamline the clearing processes conducted in accordance with the disclosed principles.

In addition to the being connected to the financial services network 210, the payment clearing system 120 is also connected to the user financial mobile devices 105 discussed in detail below. More specifically, the payment system 120 is connected to the user devices 105 via an interface 220. The interface 220 may be implemented in software, hardware, middleware, or a combination thereof. In advantageous embodiments, the interface 220 is a wireless interface 220, but this is not required in those applications where the user devices 105 are not themselves wireless. In those embodiments, where the user devices 105 are wireless, the devices 105 may be, by way of example and not limitation, a cell phone 108, a General Package Radio Service (GPRS) device, or a POS terminal 107, such as those used by merchants. Such wireless user devices 105 connect to the wireless interface 220 via a typical wireless node 230, such as a Wireless Communications Transfer Protocol (WCTP) node. Of course, any type of wireless node may be used to connect a user device 105 to the wireless interface 220.

To conduct a financial transaction using the network 205, the interface 220 is configured to receive information about a desired financial transaction from one or more users of the network 205, for example, via their user devices 105, and to receive authorization to participate in the desired financial transaction from those user devices 105 as well. To connect with wireless user devices 105, the wireless interface 220 includes a variety of carrier protocols 222, depending on what type of device 105 is used, and thus what type of carrier protocol that device 105 uses to communicate. Illustrated examples of carrier protocols 222 used by the wireless interface 220, though it is not necessarily limited to these examples, include WCTP protocols, GPRS protocols, and TCP/IP protocols. In addition to carrier protocols 222, the wireless interface 220 also includes specific device protocols 224. Such device protocols 224 include both application layer and security layer protocols specific to the type of user access means or device used with the payment network 205. In the illustrated example, only one set of device protocols 224 is illustrated where the user devices 105 are all issued by the entity instituting the network 205. However, as discussed in detail below, the user devices 105 may be issued as such, or maybe embodied in other types of user devices, such as their cell phone, PDA, e-mail device, etc. In such embodiments, a corresponding number of device protocols 224 may be employed by the wireless interface 220, so that it can successfully communicate with each user device 105.

Once information regarding a financial transaction is received by the wireless interface 220, if needed, the interface 220 is also configured to receive an acknowledgement from the first and second financial devices 105 that each device 105 has identified the other device for, and each is authorized to participate in, the desired financial transaction. For example, this could occur in those transactions where two devices 105 are touched or brought close together by two users who "agree" to participate in a desired financial transaction. However, as discussed in greater detail below, in some embodiments, no or only one user device 105 is employed in a transaction. In such embodiments, the user accesses the network to conduct a transaction via a remote access point. However, this user would still identify and authenticate himself to the network 205, and it is this such acknowledgment in these types of transactions that the interface 220 would instead receive.

Once the identifications and authorizations have been made, the wireless interface 220 communicates with the payment system 120 via a specific interface 226 with the payment system 120. In the illustrated embodiment, this specific interface 226 is a messaging application 226. As such, it may include an incoming queue for queuing requests for financial transactions coming from user devices 105, and that information may then be transmitted to the payment system 120, which has a corresponding messaging application 124. The information may be received in an incoming API in the payment system 120 configured to receive incoming information regarding specific financial transactions. In addition, the messaging application 226 in the wireless interface 220 may also include an outgoing API for receiving information about the financial transaction from an outgoing queue in the messaging application 124 in the payment system 120. That received information may in turn be processed in the application layer of the device protocol 224 for the user device(s) 105 involved in the transaction. Once processed, the information may then be secured in the security layer, and then transmitted back to the user device(s) 105 involved.

Some financial transactions facilitated by the network 205 may be implemented via an electronic checkbook 228, which is linked with one or more of a user's financial accounts. One example of such a financial transaction may be a user individually checking the balance in a checking account he has associated with the network 205. Using his mobile device 105, the user can select balance information for the linked account, and in many embodiments, the network 205 is implemented with the "push" technology discussed above, where account information is pushed down to the user as the information is updated and received by the network 205. In other embodiments, the electronic checkbook 228 may be configured to receive updates periodically, rather than in real-time. The information may be updated every day, and thus the validity of that information may be controlled by a Validity Period Control thread. Thus, if the balance information has not been updated within the appropriate period, the electronic checkbook 228 can communicate with the payment system 120 in order to receive updated information. In addition, a Transactions Validation layer may be employed, for example, to prevent hacking into others' information. Similarly, a Fraud Detection layer may also be employed, which may require users to enter a PIN or password before given access to the information in the electronic checkbook 228. Of course, other types of security may also be employed. Once the security protocols have been satisfied, an Issuing thread can cause the financial information to be sent to the user's mobile device 105, in accordance with the device protocols 224 and carrier protocols 222.

No matter what type of financial transaction is requested via the network 205, the payment system 120 facilitates the transaction. Thus, in addition to the backend gateways 122, the payment system 120 also includes Business Rules 126 by which it facilitates financial transactions. Illustrated examples of such Business Rules 126 include, but are not limited to:

- users administration settings creating user profiles
- transactions record/override
- e-mail, cell phone, bank account, credit card linking/delinking
- user address books
- currency conversion for foreign currency transactions
- server messages within the payment network
- rules in transactions for sending funds or requesting funds
- fee structures for users of the payment network
- general ledger (GL) information for real-time information on institutions' accounts
- administrative business rules internal to the network 205
- CSR business rules for customer service representatives The payment system 120, in accordance with these Business Rules 126, causes the financial institutions 110, either directly or via a financial services network 210, to transfer funds and/or information in accordance with the desired financial transaction. More specifically, the payment system 120 is configured to cause the transfer of monetary funds from a user's associated financial account to a financial account of another user. In addition, this transaction would take place in accordance with the received information about this specific financial transaction, e.g., the amount of funds to transfer, the recipient of the funds, the time for the transaction, etc. Where the rules 126 comprise user profiles, data regarding user's financial account, security information regarding the user, and specific user-established settings for their financial transactions may be included.

Figure 2A:
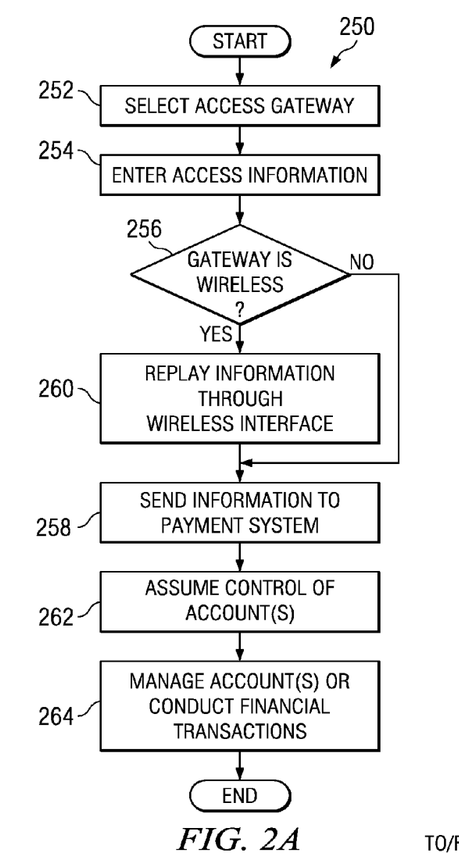
FIG. 2A illustrates a flow diagram of one embodiment of accessing the disclosed system and network from a frontend gateway, in conjunction with the network illustrated in FIG. 2.

In addition to conducting financial transactions in the network 205 with a personal financial device 105, the payment system 120 is connected to one or more access gateways 240. The access gateways 240 allow users to employ the services of the network 205 without having to use a specific financial device 105, as well as allow administrators to update and maintain the Business Rules 126. FIG. 2A illustrates a flow diagram 250 of one embodiment of accessing the disclosed system and network from such a frontend gateway 240, and may be viewed in conjunction with the network 205 illustrated in FIG. 2. Users first select which type of frontend access gateway 240 they would like to use to access the network 205 (Block 252). For example, the gateway 240 may be a website owned by the facilitator of the network 205.

In the illustrated embodiment, some of the access gateways 240 are Internet- or Wed-based gateways 242. Thus, users or administrators may access the payment system 120 via a browser program 244 or other similar means. Users may employ the services of the network 205 through the access gateway 240 they've selected by entering personal and secure information via a terminal connected to the gateway 240 (Block 254), and that information may even be kept on a card 310 like those discussed above. In fact, the terminal connected to the gateway 240 may have a card reading device for users to quickly access the network 205 via the gateway 240 by simply swiping their card 310. In addition, the access gateway 240 may also be a wireless device communications node 246. For example, the node 246 may be an HTPPS gateway 246 for use in transmitting SMS or other types of codes from cell phones 108 or other wireless devices.

No matter what type of access gateways 240 are employed, the access or login information entered by the user (or administrator, as the case may be) is sent to payment system 120, but how that information is sent could depend on how the particular access gateway 240 in use is connected to the network 205 (Block 256). More specifically, if the access gateway 240 is hard-wired to the payment system 120, then the information may be sent directly there, perhaps via a payment system 120 interface with the gateway 240 (Block 258). In some embodiments, where the access gateway 240 is wireless, then the access information may be relayed to the wireless interface 220 (Block 260), and then sent to the payment system 120 from the wireless interface 220 (Block 258). Once the user has logged on via the access gateway 240 of his choice, he can then assume control of his associated account(s), as described in detail above (Block 262). Once control of the account(s) is assumed via the gateway 240, the user may manage that account(s) or otherwise conduct desired financial transactions via the gateway 240 (Block 264).

The disclosed network 205 permits users to conduct or otherwise participate in financial transactions using a means that is distinct from the personal financial devices 105 discussed in detail below. Moreover, users may also be permitted to establish or modify their personal rules in their user profile via such an access gateway 240. In addition, administrators of the network 205 may also use the access gateways 240 to access the Business Rules 126 in the payment system 120. Again, this access may also be web-based, but any other remote access means is also possible with the disclosed network 205. By accessing the Business Rules 126, the administrators may establish new rules, and maintain or modify existing rules, as needed. Also as illustrated, the access gateway 240 may be a CSR web-based access point. Through such a point, customer service representatives may access the payment system 120 remotely from the network 205.

A network 205 according to the disclosed principles works by electronically clearing financial transactions against users' existing bank, credit or other financial accounts. Thus, the payment network 205 is actually a transaction clearing system employing a transactional database that can be accessed through one of the mobile devices 105 disclosed herein, or even through the Internet, via e-mail, SMS, etc. using card 310 the user's membership information associated with the payment network 205. In addition, the network 205 has an open architecture, which enables other banks, other financial institutions, utility companies, manufacturers, or any other merchant or business to easily connect and become part of the disclosed payment network 205. Once a part of the network 205, each of these entities could provide all of the services available through the payment network 205 directly to their customers as well.

In the case of banks and credit card companies, for example, they can enable their existing accounts to work with the disclosed network 205. Thus, when a bank enables its accounts to work with the network 205, it may issue a card 310 for each user account, and these cards 310 could contain the information or chip that enables it to work in one the personal financial devices 105 discussed below. In addition, such a card 310 does not need to be exclusive to the device 105 or the network 205; it can be designed also as a typical charging card that still works with, for example, Visa®, MasterCard® or whichever network the bank was already using. Thus, a user may use that card 310 to check the balance of the account, manage the account, make purchases at any Visa merchant, make cash withdrawals at a compatible ATM, and access the network 205 for any other needs, all with the same card 310. Such an embodiment would enable financial institutions that are not providing innovative and efficient payment services (e.g., e-mail or online payments, SMS payments, etc.) to provide all such services once they become a part of the network 205. Even if they do not join the network 205, their financial accounts could still receive payments in the manner described above.

In the case of utility companies, merchant stores, and other companies that want to provide their own banking services, the network 205 would allow these entities to receive payments from users if they simply have an account connected to, for example, a financial services network, or to the network 205 itself. As discussed below, they may even have their own device 105 for receiving (and making) payments in the manner described above.

Figure 3:
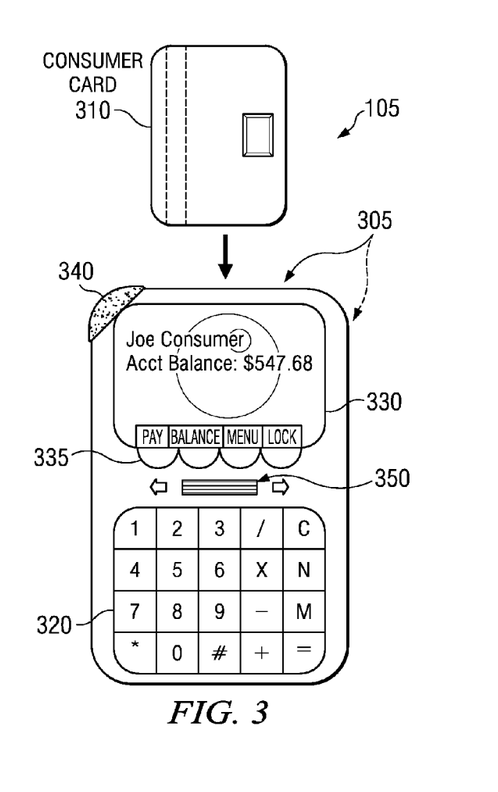
FIG. 3 illustrates one embodiment of a mobile personal transaction device or device constructed in accordance with the disclosed principles.

Illustrated in FIG. 3 is one embodiment of an exemplary mobile electronic device 105 that can be used for the electronic commercial transactions described herein. Such disclosed devices 105 may facilitate the electronic transfer of funds and electronic purchases between consumers and merchants, as well as between two individuals. Also, these devices 105 allow users to conveniently and securely access their credit- or debit-based personal accounts in real-time via the device 105. In addition, the disclosed devices 105 provide for such transactions without the need to fund and maintain a specific account held by this financial service.

The devices 105 accomplish desired financial transactions, whether this includes the sending of monetary funds, the receiving of monetary funds, a request that someone send monetary funds, or even managing the user's own account, by communicating with a payment system or network from a remote location. The payment system described in detail above is in communication with one or more financial institutions that are facilitating financial accounts, such as checking accounts, savings accounts, revolving credit accounts, lines of credits, money market accounts, etc., corresponding to users of these devices 105. Users would associate one or more of their accounts managed by these financial institutions with the payment system, and information about that associated financial account is provided to the device 105. In one embodiment, a security device 310, such as a card 310 having a magnetic strip, a SIM card, a biometric system, or other means of security verification, includes this information.

In the illustrated embodiment, the device 105 includes a reading unit 305 may include a card slide that may be accessed through the illustrated slot at the top of the device 105, so the security device 310 can be provided to and read by the device 105. Alternatively, the reading unit 305 may be accessed from the side of the device 105 (shown in broken arrow 305), and no limitation on its placement is intended. The security device 310 provides assurance that only authorized users of accounts that are associated with a particular consumer can be used by that consumer or accessed by that consumer to make money transfers or purchases. More specifically, in embodiments employing a card 310, the card may be a conventional debit card that can be used in automated teller machine (ATM) networks and Merchants (e.g., a Visa Electron® or a MasterCard Maestro®). This card 310 may contain, in addition to the usual magnetic strip, a chip with proprietary information unique to the disclosed payment network. Such a card 310 acts similar to a SIM card in a cell phone, and in advantageous embodiments, may be inserted into any mobile device 105 configured to work with the disclosed network to conduct financial transactions.

The device 105 also includes user controls 320 for manually inputting information, by the user, about a desired financial transaction, as well as inputting information for authorizing the financial transaction. In the illustrated embodiment, the user controls comprises a keyboard or keypad 320 having buttons or keys much like those that would be used in personal digital assistants (PDAs), personal e-mail devices (e.g., BlackBerry® devices), or mobile telephones. The information input using the keypad 320 for authorizing the desired financial transaction may include inputting a personal identification number (PIN) or other security code associated with the user. Such a security code can be used to "unlock" the device 105 so that it may be used, to authenticate that the card 310 matches the user, or even to access information regarding accounts that the user has previously associated with a network used with the device 105 (discussed in greater detail below).

In addition, the information about the desired financial transaction input using the keypad 320 may comprise information for transferring monetary funds from a financial account associated with the user of the device 105 to a second financial account associated with a second user associated with the second device (not illustrated). More specifically, information for transferring monetary funds may include, but is not limited to, information providing identification of the second user, the amount of the transfer of monetary funds to be sent or received, the selection of the user's financial account to be used for a certain transaction from a plurality of financial accounts associated with the user, a date of the desired financial transaction, or a selection of whether the desired financial transaction is a request for monetary funds from another user, or an attempt to transfer monetary funds to the other user. Still further, the keypad may also provide tools for the user of the device 105, such as a calculator for computing numbers involved in specific financial transaction.

The device 105 also includes a display screen 330 for displaying information about the desired financial transaction or user financial account(s). Like the keypad 320, the display screen 330 may be the same or similar to screens used in other mobile devices, such as an LCD display screen 330. Illustrated in FIG. 3 are possible items that can be shown on the display screen 330. These items could include the user's identification, a specific financial account of the user previously associated with the network used by the device 105, or an account balance for that financial account. In addition, the display screen 330 may also include "touch-screen" capabilities to augment, or even replace, the keypad 320 keys discussed above. For example, various "action buttons" that could be activated by touch screen buttons 335 may be included in the device 105. As will be later described, these actions could include such things as the sending of money, the requesting of money, the initiation of a purchase, or the exchange of identifying information between the user of the device 105 and another party. The device 105 may even include a trackwheel 350, such as those found on BlackBerry® devices.

Moreover, since the keypad 320 and display screen 330 are both similar to those found in some personal mobile electronic devices, the principles and technology described herein could be readily integrated into such existing PDAs, mobile telephones, e-mail devices or other electronic devices. Such an implementation of the disclosed principles may be beneficial to those users who wish to only carry one mobile device; an increasing sector or the population, as evidenced by the success of integrated mobile devices such as the iPhone®.

As also shown in FIG. 3, an identification module 340 is provided through which tactile and visual indicators can be used to authorize inputs and provide feedback to users regarding electronic transactions. The identification module 340 identifies a second mobile device to be involved in the desired financial transaction, and identifies the first device 105 to the second device. In operation, which is also described in further detail below, the identification module 340 identifies the second device to the first device 105, and identifies the first device 105 to the second device, by bringing the identification module 340 of each device 105 within at least a predetermined proximity of each other. In some embodiments, the identifications are performed when the identification modules 340 "hand shake" through physical contact, or "nose rub," each other during a financial transaction.

In the illustrated embodiment of FIG. 3, the identification module 340 is shown as including a button 340 on or integrated with an exterior housing of the device 105. In a specific embodiment, the button 340 could be a silicone button 340, however, any beneficial material may be employed. In addition, the module 340 may comprise a visual indicator indicating if the identifications have been made. In such embodiments, the visual indicator may be a light within a button 340 configured to change colors when the identifications have been made. For example, the integrated light contained within the button 340 could shine red or green, depending on the status of the pending transfer of funds. In some embodiments, a red light could indicate that the identifications have not been made and the transaction has not yet been authorized or completed. In contrast, a green light could indicate that all identities have been verified, and perhaps also that the transaction authorized, and may even indicate that the transaction has actually been completed. Of course, any number and type of visual indicators, each indicating various information to the user(s), may be employed with a device 105 constructed in accordance with the disclosed principles, as will be seen with the discussion of device 105 "hand shaking" with reference to FIG. 6.

Figure 3A:
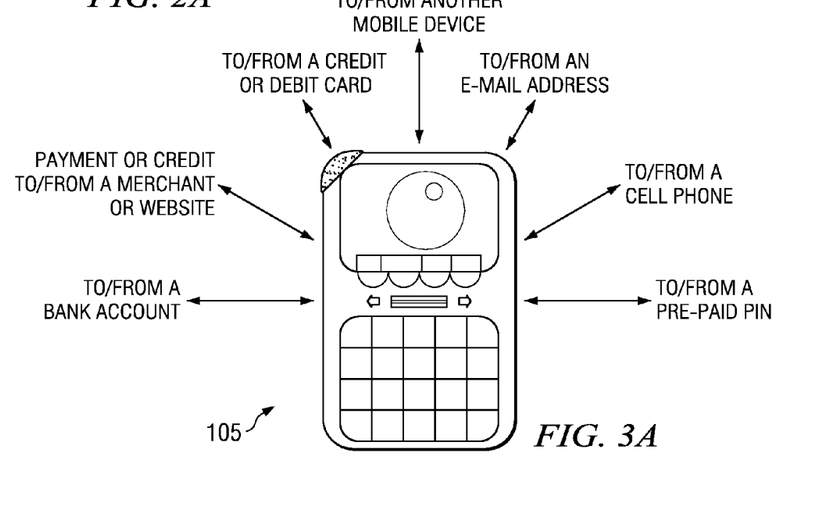

The device 105 also includes a transceiver, and related circuitry, within the device 105. The transceiver is for wirelessly transmitting and receiving information to and from the payment system mentioned above. More specifically, once a financial transaction has been authorized and is ready to be completed, the transceiver sends commands from the device 105 to the payment system so that the payment system causes the transfer of monetary funds to or from the associated user financial account. As illustrated in FIG. 3A, a mobile device 105 in accordance with the disclosed principles can be used to send fund to, or receive funds from, a variety of sources and destinations. For example, the device 105 can be used to send funds to, or receive funds from:
- another mobile device 105
- a credit, debit or other monetary-based card
- payment to or receive credit from a merchant, online website, etc.
- a bank or other financial account
- to any e-mail address, or from an e-mail address when used with a consumer card 105 as described above
- to any cell phone, or from a cell phone when used with a consumer card 105 as described above However, it should be noted that the funds in financial transactions conducted according to the disclosed principles are not actually sent to or from the actual device 105. Instead, the device 105 is employed with a network as disclosed herein and described in further detail below, to cause funds to be sent from or to a financial account associated with the disclosed payment network. Further discussion of such transactions is provided below.

Moreover, using the personal mobile device 105, users can access balance and transaction information and history in real-time. They are notified of all financial transactions on their account(s) in real-time, for example, using "push" technology that automatically pushes updated information to users, without first requiring the user to request the information. They can pay anybody else connected to the network 205 such as another individual with a mobile device 105 by, for example, simply touching the other device 105 and entering the amount of the transaction (as discussed with regard to device "nose rubbing" below). They can pay a merchant by simply touching (or being proximate to) the cash register of other merchant equipment in communication with the network 205. This instantly allows them to see the invoice in the display screen 130 of the device 105, and pay it or decline it. Moreover, users can send payments to any other user of the network 205, anywhere in the world, to any bank account, e-mail address, cell phone number, SMS code, etc., and they can receive payments from any source on their device 105.

Figure 3B:
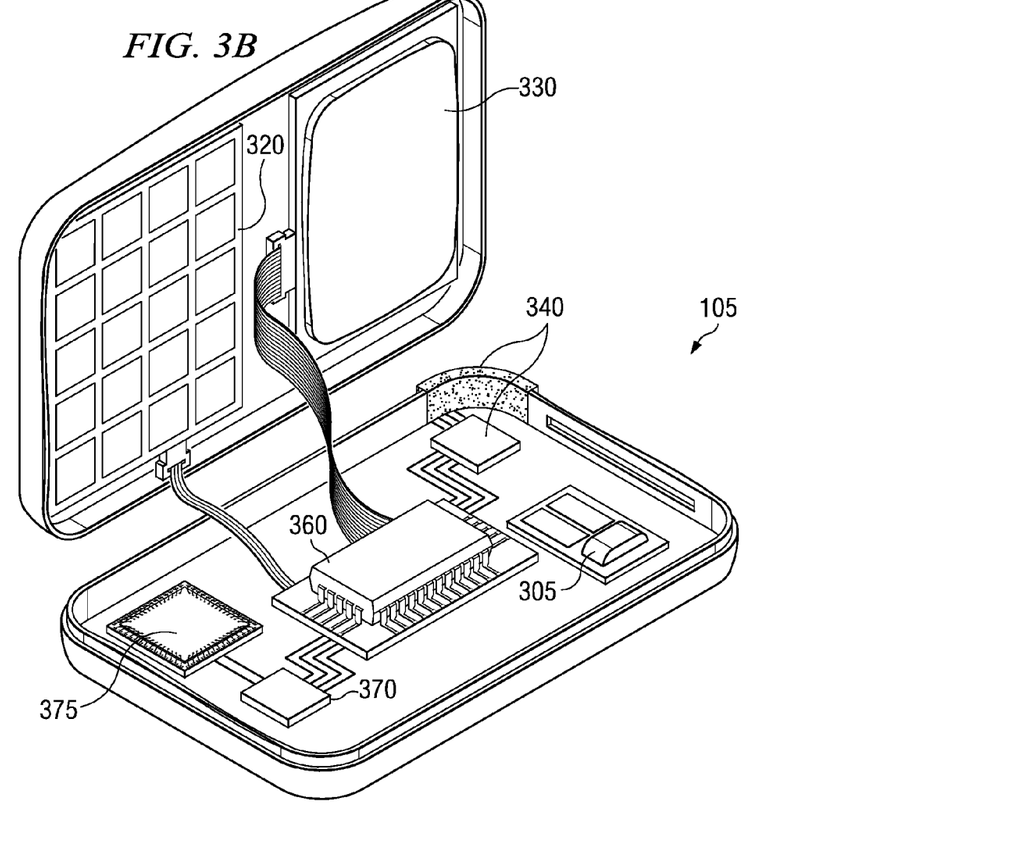
FIG. 3B illustrates an isometric view of an exemplary embodiment of the internal circuitry of the device discussed with reference to FIG. 3.
Figure 3C:
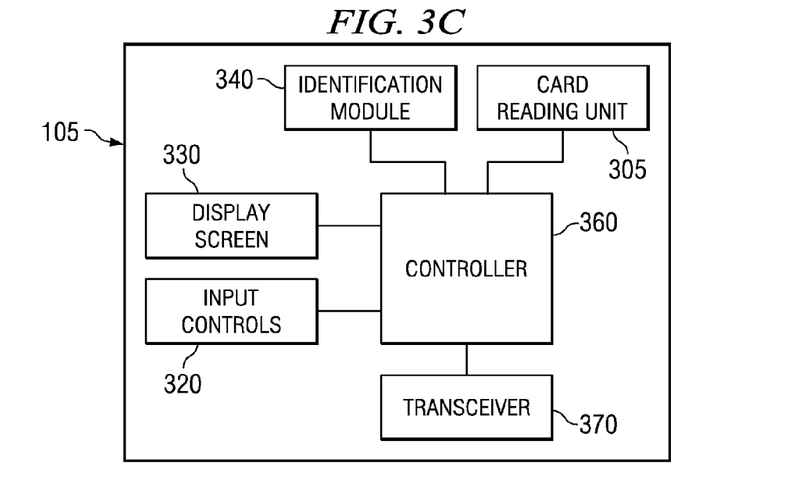
FIG. 3C illustrates a 2-D block diagram showing electrical connections between some of the components that may be included in the device.

FIG. 3B illustrates an exemplary embodiment of the internal circuitry of mobile financial device 105, such as the device 105 discussed with reference to FIG. 3. FIG. 3C illustrates a 2-D block diagram showing electrical connections between some of the components that may be included in such a device 105. As illustrated, an exemplary financial device 105 could include a controller for use in conducting one or more of the financial transactions discussed above. The device 105 could also include the reading unit 305 connected to a controller 360, such as a microprocessor chip or the like. As mentioned above, the reading unit 305 is operable to detect the information about the user financial account previously associated with a payment system via a card 310 or other input device. Also, the user controls 320 would be electrically connected to the controller 360 and operable to receive manually input information by a user about a desired financial transaction, and information for authorizing the financial transaction.

The display screen 330 would also be electrically connected to the controller 360 and operable to display the information about the desired financial transaction or user financial account, as described above. The identification module 340 would also be connected to the controller 360, and as mentioned is operable to, for example, identify a second financial device 105 involved in the desired financial transaction to the first financial device 105, and to identify the first financial device 105 to the second financial device 105. Furthermore, a transceiver would be electrically connected to the controller 360 and operable to wirelessly transmit and receive information to and from the payment system for causing the transfer of monetary funds to or from the associated user financial account(s). An antenna 375 could be connected to the transceiver 370 to assist in the transmitting and receiving of such information.

Figure 4:
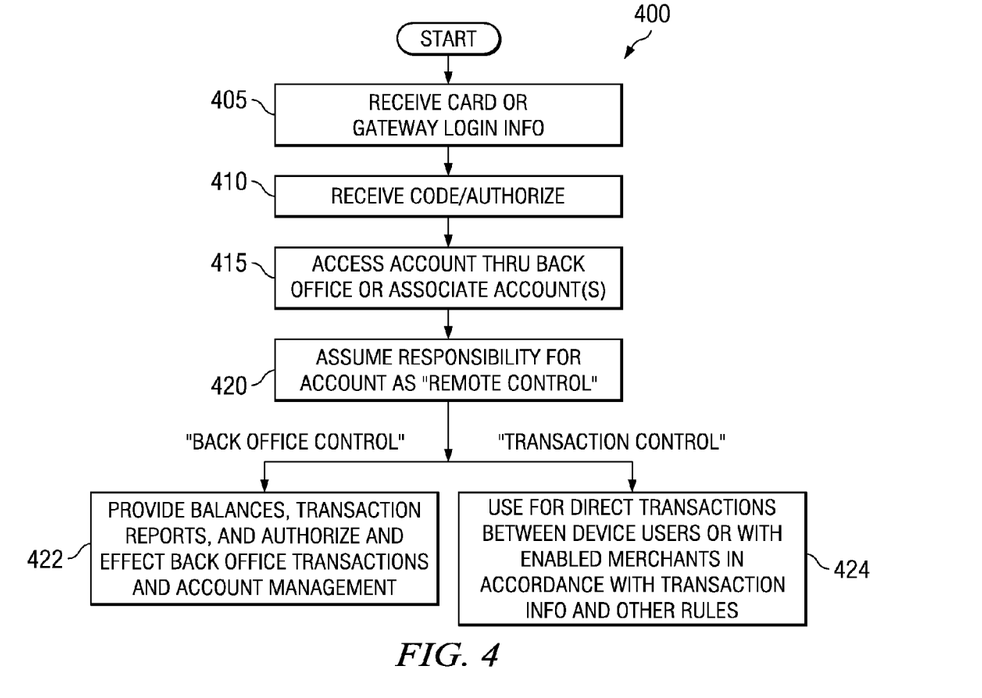
FIG. 4 illustrates a flow diagram demonstrating exemplary methods for managing a personal account and for managing electronic transactions conducted using a mobile personal transaction device.

FIG. 4 illustrates a flowchart 400 demonstrating exemplary methods for managing a personal account and for managing electronic transactions conducted using a mobile personal transaction device 105, such as the device discussed with reference to FIGS. 3-3C. While only certain actions are illustrated and discussed with reference to FIG. 4, it should be understood that a greater or lesser number of actions for conducting financial transactions, etc. in accordance with the disclosed principle may be employed. Accordingly, the process in FIG. 4 is merely exemplary in nature, and is not intended to limit the overall scope of the principles herein to any particular action or application.

As previously described, a security card 310 could be provided to authorize the use of such a device 105 with a particular user's account that has been associated with the payment system. In other embodiments described below, the card 310 may instead be used to access a network as disclosed herein directly via a website or other frontend gateway in order to perform transactions or simply access registered account information. Looking at the flow diagram 400, after a Start block where any needed hardwire or software for the system or network is initialized, at Block 405 an action is shown in which the device 105 transmits the information it received from the card 310 in order to perform the authorization action of Block 410. As previously discussed, the authorization step in Block 410 might be only through the insertion of a separate physical card, such as a bank card, credit card, SIM card 310, or through biometric or other authorization means, such as the entry of an access code (e.g., a PIN). Moreover, as discussed in further detail below, the authorization may be made in conjunction with the disclosed payment system, which in turn may employ a database or user profiles to assist in authenticating the user directly, the device, the account, the recipient, the transaction, or any combination thereof. In any event, the network receives the code/authorization information from the user (e.g., via transmission by the device 105 if one is being used), and authorizes the user and/or device 105 to proceed with access to his account(s) and, any desired transaction.

As shown at Block 415, once the device 105 has been authorized to access a particular account and conduct a specific financial transaction according to the authorization Block 410, the user's account can be accessed by the network through a "back-office" application (e.g., a backend gateway) whereby the user's credit or debit account (or other type of account) can be accessed. Alternatively, if the user does not yet have an account associated with the payment network, it can be registered or otherwise associated with the network at this time so that access to that account can be gained. Such access is further described below with reference to the overall system and network constructed and implemented in accordance with the disclosed principles. At Block 420, after the network has gained access to the user's registered account(s), the user, via the device 105, can then assume responsibility for the real-time management of the user's account as a "remote control" for that account since that account has been associated with the payment system. In some embodiments, a user's financial account may only be associated with the payment system once he has received a request to send funds, and that user agrees to participate in the transaction by opening an account with the disclosed payment network. In either case, as shown in Block 422, balances for associated financial accounts may be provided to the first user through the display screen 330 of the device 105, as well as transaction reports and other account information. Further at Block 422, the device 105 can be used to authorize and effect other back-office transactions. Such back-office transactions could include the approval of automated clearing house (ACH) transactions or other electronic transactions among financial institutions that could be sought through the user's personal financial account.

As previously described, and as further shown in Block 424 of FIG. 4, the device 105 may also be used for direct transactions between device holders or direct transactions with merchants enabled to conduct financial transactions within the disclosed payment network. In other words, two users having a mobile device 105 as disclosed herein may exchange funds or exchange information through a protocol that will be described in further detail with reference to FIG. 6, or the user can interact and make purchases with a vendor or merchant using a similar approach. Likewise, a registered user can perform any such transaction by accessing the network via a frontend gateway, such as a website. No matter the type of transaction, the network would receive information regarding the desired financial transaction in which the user(s) wishes to participate. The transaction may then be conducted in accordance with that information, and in accordance with any other 'rules' stored in the one or more user's profile associated with the network.

Figure 5:
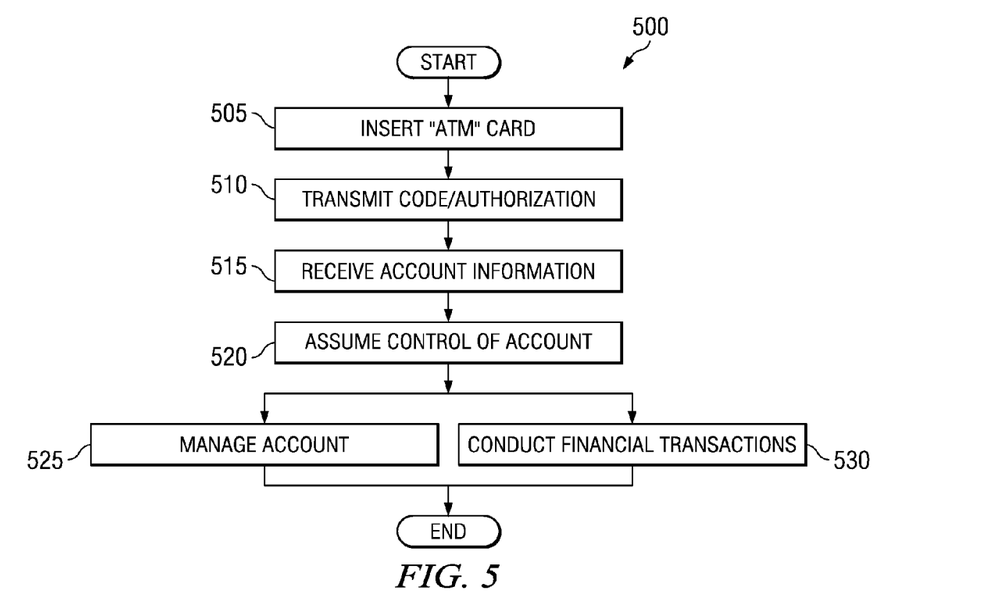
FIG. 5 illustrates a flow diagram of one embodiment of accessing the disclosed system and network from the device side, in conjunction with the flow diagram in FIG. 4.

FIG. 5 provides a flow diagram 500 illustrating one embodiment of accessing the disclosed system and network from the device 105 side, and may be viewed in conjunction with the blocks in flow diagram 400 in FIG. 4. More specifically, at a Start block the device 105 is turned on and initialized so that it may be used by the user in a desired financial transaction.

At Block 505, the user inserts his card 310 into the reader of the device 105, and the information from the card 310 is uploaded into the device 105. At Block 510, the device 105 transmits the code or other authorization information to the network in order to authorize the device 105 and user to participate in the desired financial transaction. As previously discussed, the authorization information may be obtained from the user by any of a number of different means, for example, through the insertion of a separate physical card 310 as just described, or through biometric or other authorization means, such as the entry of an access code (e.g., a PIN).

As described above, once the device 105 has been authorized to access a particular account based on the authorization information transmitted at Block 510, the user's account can be accessed through a back-office application whereby the user's financial account is accessed by the network. Once the account is accessed by the network, the device 105 can received current account information, at Block 515, which would typically include the current account balance. Other information transmitted to the device 105 may also include information on past recent transactions, maximum per-transaction limits (if any are imposed), a list of other users (e.g., the user's wife) authorized to access the account, recent transactions of such a second user, or any other beneficial information on the account. At Block 520, the user, via the device 105, can then assume responsibility and control for the real-time management of the user's account that has been associated with the payment system.

As shown in Block 525, once control of the account(s) has been seized by the device 105, the user can conduct account management activities. For example, he can affirmatively access account balances for the one or more associated financial accounts, which can be shown to the user through the display screen 130. In addition, as shown at Block 530, the device 105 can also be used to authorize and conduct financial transactions using the registered account(s). For example, the user can elect to send funds to someone, or to approve the receipt of funds from someone else. Other exemplary financial transactions that the user could conduct via the device 105 are discussed in greater detail below. As mentioned above, two users having a mobile device 105 may exchange funds or exchange information through an exemplary protocol described with reference to FIG. 6.

Figure 6:
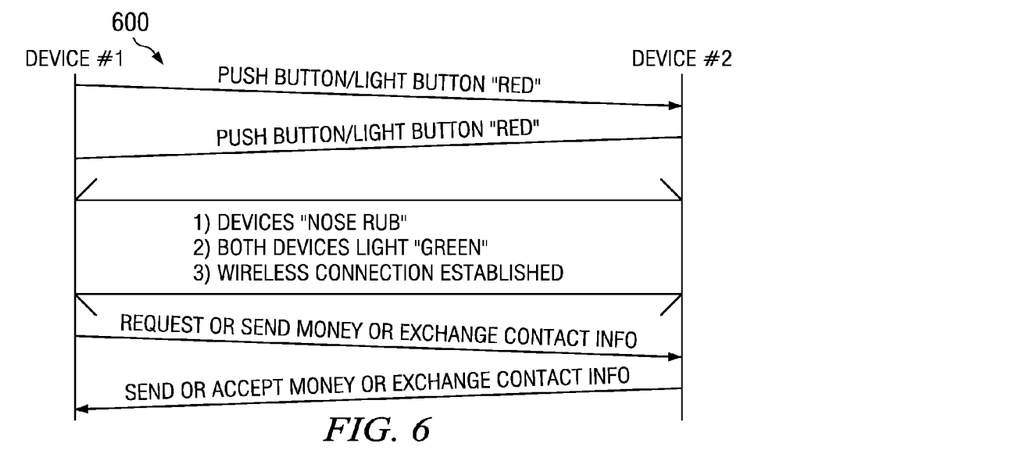
FIG. 6 illustrates a one embodiment of the "handshaking" between two mobile personal transaction devices that may be implemented during a financial transaction conducted in accordance with the disclosed principles.

FIG. 6 illustrates one embodiment of the "handshaking" process 600 between two mobile personal transaction devices 105 that may be implemented during a financial transaction conducted in accordance with the disclosed principles. Additionally, a similar technique could be adapted for interaction with a merchant or service provider as well.

Specifically, as shown in FIG. 6, to initiate a desired financial transaction, the user of a first device (Device #1) could push button 340, which in this example would then light red to show that a transaction has been initiated but has not yet been authorized or completed. The user of a second device (Device #2), who, presumably, would be in the same vicinity as the user of Device #1, could correspondingly press his button 340, which would then also light red. Of course, no particular order is required. At that time, the devices could have both been prepared to be linked for the transaction. At that time, the devices could "touch noses" (i.e., button-to-button or corner-to-corner) in order to initiate the transaction. This "nose rub" would be sensed by both devices which would then perform an electronic handshake in order to enable the electronic financial transaction between them to proceed. Alternatively, the devices 105 could only be brought to within in a certain proximity of each other to conduct the handshake. No matter how the handshaking occurs, the light in the button 340 could switch in both devices from the color red to the color green, indicating that the two devices are in communication for the commercial transaction. The users could then enter the details of the desired transaction, and execute the transaction accordingly. Additionally, the link between devices may be limited to a predetermined time, at which time if the transaction has not been completed, the communication between the devices would end, and any ongoing transaction would be terminated.

Once the devices have been fully enabled for the financial transaction, the menu on the display 330 could then be configured to provide a user-friendly interface for initiating one or more financial transactions between the two parties. For example, the identity of the other person in the transaction, along with a menu of possible transactions or activities to engage in with that other user, could be shown in the first user's display screen 330 (and vice versa for the user of Device #2). As illustrated in FIG. 6, for example, the user of Device #1 may at this stage request or send money, or request to exchange contact information with the user of the other device, to complete that particular transaction. The user of Device #2 could then send money in response to their request, or accept money in response to the user sending the money, or perhaps simply exchange contact information with the other user.

In accordance with the disclosed principles, there are many different ways to configure the handshaking at the transactional level. Therefore, the approach illustrated in FIG. 6 is merely exemplary in nature, and it should be appreciated that the scope of the disclosed principles will be as set forth in any of the claims ultimately issuing from this disclosure. Moreover, the identifications and authorizations of devices engaging in a financial or type of transaction, may be done at any point during the financial transaction. For example, one or more users may enter information into their respective device, such as an intended recipient of certain funds, or a specific person from which funds are requested. Such a user(s) may then enter security/authentication information into their device, such as a security code only authorized users of that device or with access to a certain financial account would have. Once such information is entered, and/or received by a second party to the transaction, the devices may then be brought together to "handshake." At this point, the transaction may then be completed, whether in response to the handshake or by pressing a button or key to "accept" or otherwise complete the transaction.

Also, an acknowledgement that the transaction was successful may then be displayed to the participants in the transaction. Alternatively or in addition, the change of color of an indicator light, if present, may be such an acknowledgement. Moreover, such handshakes between devices (or between a device and a similarly equipped merchant terminal) may be completed by either touching the devices together, or simply bringing the devices within a predetermine range of each other, sufficient for the identification module in one mobile device 105 to detect the other. In yet other embodiments, the devices 105 need not be brought together or be located proximate to each other, such as in a transaction taking place across long distances. In such embodiments, other safeguards in lieu of the personal handshake may be instituted, such as an additional security code, to ensure such long distance transactions are valid. In fact, one or both users may simply access the disclosed payment network via a website or other portal or frontend gateway in order to complete transactions over long distance where individual devices 105 cannot be brought together.

Figure 7:
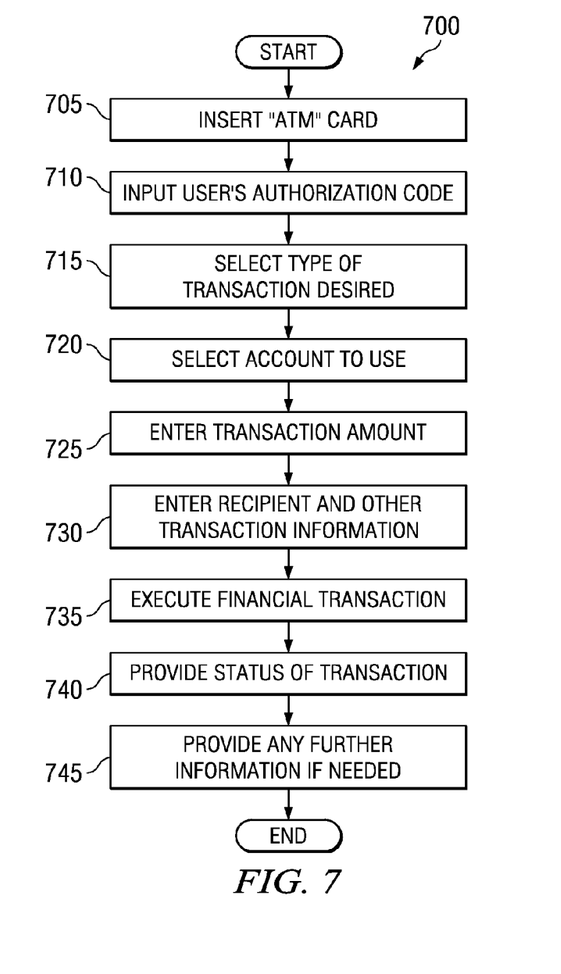
FIG. 7 illustrates a flow diagram of an example of a financial transaction conducted by a registered user of the network using a mobile device.

FIG. 7 provides a flow diagram 700 illustrating another detailed example of a financial transaction conducted by a registered user of the network 100 and using a device 105 as described above. Through the type of networks 100 and 200 illustrated in FIGS. 1 and 2 and implemented in accordance with the disclosed principles, the payment system 120 may be configured to cause the transfer of monetary funds from a user's associated financial account to a financial account of another user in accordance with this exemplary process 700. Of course, other actions may also be included in such individual transactions.

At a Start Block, the user would turn his device 105 on, which would then initialize its internal software and hardware so that it can be used for the financial transaction. At Block 705, the user inserts or swipes his card 310 into the reader of the device 105, and the information from the card 310 is uploaded into the device 105. As discussed above, the device 105 transmits authorization information to the network 100, 200 that indicates this specific device 105 is authorized for use with the network 100, 200. At Block 710, the system can be setup to require the user to input a code or password as well, in order to ensure the user is authorized to use the card 310 inserted in the device 105.

To participate in a desired financial transaction, at Block 715, the user may then use the device 105 to select the type of transaction in which he would like to participate. For example, the user may select "Check Balance" to receive a current balance of available funds from a registered account (which may also be provided using "push" technology, as mentioned above), "Send Money" to send money to another user or account, or "Request Money" to request monetary funds from another user of the network 100, 200. Alternatively, the type of transaction selected by the user may actually be to "Accept" a request for funds from another user. This acceptance may be for simply sending money to another user, or may be accepting a request to pay a merchant's request for payment for a purchase.

At Block 720, an optional step may be for the user to affirmatively select which account he wants to use for the desired financial transaction. For example, the user may have both a checking and a revolving credit account registered with the network 100, 200, and the user would select which account he would like the funds transferred to or from for each specific financial transaction. Once the account has been selected, and assuming the transaction will include a transfer of monetary funds, the user can enter the amount for the particular financial transaction, which is shown at Block 725. In addition, at Block 730, the user can also enter other information regarding the specific desired financial transaction. For example, the user could enter a date and time from the transaction, if the transaction is not to be executed immediately. Also, the user could select the specific recipient if the transaction is to send funds to someone. In some embodiments, the user may maintain a list of potential recipients, and then select the appropriate recipient from the list.

Once all the necessary information for the desired transaction has been entered into the device 105 by the user, at Block 735, the user could then be prompted to execute the financial transaction. This could be done by the user selecting "Submit" or a similar displayed option, or perhaps even by the device 105 "nose rubbing" described with reference to FIG. 6. Once approved, the transaction would then occur in accordance with any other rules that may be maintained in the user profile of the sender of funds, the receiver of the funds, or both. If the transaction is completed as desired, the user could be notified of the successful completion of the transaction at Block 740. Alternatively, if the transaction has a problem or is delayed (for example, if the recipient needs to join the network 100, 200 before the transaction can be completed), that status may also be displayed to the user. If any further action is required by the user, perhaps in response to a problem with the transaction, the user may provide any needed information, at Block 745, via the device 105. The process could then end at an End Block.

Importantly, the disclosed principles provide for the funds of a user's account to never leave his original financial account until the financial transaction takes place. The transactions made through the disclosed network 100 using the devices 105 are executed through the payment system 120, which operates in a manner similar to an ATM network where a set of transactional parameters are defined and agreed upon through one or more networks. This is similar to the way ATM network transactions are standardized for the PULSE® or CIRRUS® ATM networks. Thus, no special accounts within the payment system 120 are required to be opened, maintained, and funded by a user. Instead, funds are simply transferred to or from a user's original financial account by the financial institution 110 maintaining that account and in accordance with instructions from the payment system 120.

In sum, the disclosed principles provide for the funds of a user's account to never leave his original financial account until the financial transaction takes place. Thus, no special accounts within the payment system are required to be opened, maintained, and funded by a user. Instead, funds are simply transferred to or from a user's associated financial account by the financial institution maintaining that account and in accordance with instructions from the payment system. With a clearing network constructed and operated in accordance with the disclosed principles, contrary to conventional networks a marginal cost of $0.00 per transaction may be achieved, regardless of the amount of a transaction or the volume of transactions. In addition, the disclosed principles provides users/members with real-time availability of received funds, which is not true with conventional checks or even credit card transactions.

Furthermore, a clearing network according to the disclosed principles is completely secure to the end user. Specifically, transactions are accomplished using unique identifiers, such as a user's email address or mobile phone number, rather than disclosing or providing his confidential account number or other information to the other party in the transaction. In this sense, the disclosed clearing network is similar to existing ATM network, which are not typically owned or operated by the banks facilitating user accounts. Thus, unique IDs are matched to existing user accounts by the disclosed payment clearing system so banks or other financial institutions receive the proper routing information for transferring funds. If a user has an account with a non-member institution, the user can simply receive a message (e.g., an email or an SMS message) inviting him to join the network by opening an account at a member bank, or, if wishes not to, the disclosed network can employ an ACH or similar service to have the funds transferred to the non-user's account.

Moreover, it is envisioned that the payment clearing network and process disclosed herein may be implemented in a number of ways. For example, these principles could be implemented via a dedicated mobile transaction device, which is discussed immediately below. In addition, these principles could be implemented via an API installed in merchant POS terminals, or alternatively, such merchants may also have a dedicated transaction devices. Also, a consumer-based API may be implemented via a web gateway or other frontend access portal. Furthermore, these principles could be implemented via a commercially available mobile device, such as mobile phones or PDAs offered by any manufacturer, but configured to cooperate with the payment clearing system and network. For such commercially available devices, or for any implementation, any needed software, middleware or hardware may be installed in order to ensure operability of all the features provided by the disclosed clearing network.

While various embodiments of the devices, systems and related methods constructed and implemented in accordance with the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for establishing a communications link for managing an electronic transfer of funds between a first user financial account and a second user financial account in real-time, the method comprising:
    linking, via the established communications link, a payment system that is independent of a financial services network, financial institutions and the first and second user financial account with a system associated with at least one of a financial services network and a plurality of financial institutions through one or more backend gateways;
    linking, via the established communications link, the payment system with one or more user devices having a device-specific interface through one or more networks having an interface defined by a carrier protocol and an application protocol;
    receiving information at the payment system about a desired financial transaction between the first user financial account and the second user financial account from one or more user devices via the interface;
    receiving authorization regarding the specific desired financial transaction at the payment system to complete the desired financial transaction from the one or more user devices via the interface; and
    processing, by the payment system, based upon the received authorization, the desired financial transaction to generate directions to at least one of the plurality of financial institutions to complete the desired financial transaction, the directions providing, via the backend gateway, a uniform interface between the payment system and the plurality of financial institutions.

2. The method of claim 1, wherein the one or more user devices are selected from a mobile telephone, a point-of-sale (POS) terminal, or personal computer.

3. The method of claim 1 further comprising:
    using the one or more networks to link the payment system with the one or more user devices through the interface, the interface further comprising a wireless interface,
    wherein the wireless interface is implemented in a software, a hardware, a middleware, or any combination of software, hardware, and middleware,
    wherein the wireless interface receives information about the desired financial transaction between the first user financial account and the second user financial account from at least one of the user devices, and
    wherein the wireless interface communicates the desired financial transaction to the payment system.

4. The method of claim 1, further comprising processing the desired financial transaction using one or more security protocols.

5. The method of claim 4, wherein processing the desired financial transaction using one or more security protocols comprises employing at least one of a validation layer and a fraud detection layer.

6. The method of claim 1, wherein processing the desired financial transaction comprises evaluating the desired financial transaction in relation to at least one of: a user profile, a user's financial account, a transaction record, a user address book, a currency conversion for foreign currency transactions, a fee structure, a set of administrative requirements, a set of customer service requirements, and a general ledger of an financial institution's accounts.

7. The method of claim 1, further comprising linking the payment system with both a first user device and a second user device through one or more networks.

8. The method of claim 7, further comprising:
    initiating a link between the first user device, the payment system, and the second user device by performing an electronic handshake between the first user device and the second user device.

9. A system for establishing a communications link for managing an electronic transfer of funds between a first user financial account and a second user financial account in real-time, the system comprising:
    a payment system that is independent of a financial services network, financial institutions and the first and second user financial account, the payment system being linked with a system associated with at least one of a financial services network and a plurality of financial institutions through one or more backend gateways via the established communications link; and
    at least one or more user devices having a device-specific interface through one or more networks having an interface defined by a carrier protocol and an application protocol,
    wherein the payment system is configured to:
    receive information about a desired financial transaction between the first user financial account and the second user financial account from the one or more user devices via the interface;
    receive authorization regarding the specific desired financial transaction at the payment system to complete the desired financial transaction from the one or more user devices, the authorization being specific to the desired financial transaction; and
    process, by the payment system, based upon the received authorization, the desired financial transaction to generate directions to at least one of the plurality of financial institutions to complete the desired financial transaction, the directions providing, via the backend gateway, a uniform interface between the payment system and the plurality of financial institutions.

10. The system of claim 9, wherein the one or more user devices are selected from a mobile telephone, a point-of-sale (POS) terminal, or personal computer.

11. The system of claim 9, wherein:
    the interface further comprises a wireless interface linking the payment system with at least one of a first user device and a second user device through the one or more networks,
    the wireless interface is implemented in a software, a hardware, a middleware, or any combination of software, hardware, and middleware,
    the wireless interface receives information about the desired financial transaction between the first user financial account and the second user financial account from at least one of the first user device and the second user device, and
    the wireless interface communicates the desired financial transaction to the payment system.

12. The system of claim 9, further comprising one or more security protocols for evaluating the desired financial transaction.

13. The system of claim 12, wherein the one or more security protocols comprises at least one of a validation layer and a fraud detection layer.

14. The system of claim 9, wherein the payment system is linked with both a first user device and a second user device through one or more networks, wherein a link can be formed between the first user device, the payment system, and the second user device by performing an electronic handshake between the first user device and the second user device.

* * * * *